United States Patent [19]
Winkler

[11] 3,735,679
[45] May 29, 1973

[54] CAMERA WITH IMPELLER-ACTUATED SOURCE OF ARTIFICIAL LIGHT

[75] Inventor: Alfred Winkler, Munich, Germany

[73] Assignee: Agfa-Gevaert Aktiengesellschaft, Leverkusen, Germany

[22] Filed: May 24, 1971

[21] Appl. No.: 146,291

[30] Foreign Application Priority Data
May 23, 1970 Germany..............P 20 25 180.3

[52] U.S. Cl. ..................95/11.5 R, 95/11 L, 240/1.3
[51] Int. Cl. ..............................................G03b 15/04
[58] Field of Search ..................95/11.5 R, 11 R, 95/11 L; 240/1.3; 431/92, 93

[56] References Cited
UNITED STATES PATENTS

| | | | |
|---|---|---|---|
| 3,576,155 | 4/1971 | Beach | 240/1.3 |
| 3,603,228 | 9/1971 | Kremp et al. | 95/11 R |
| 3,552,287 | 1/1971 | Fink et al. | 431/93 |
| 887,021 | 6/1971 | Pickering et al. | 95/11 L |
| 3,588,300 | 6/1971 | Sturm | 95/11.5 R |
| 3,528,353 | 9/1970 | Colville | 240/1.3 X |
| 3,584,555 | 6/1971 | Bresson | 95/11.5 R |

Primary Examiner—Robert P. Greiner
Attorney—Michael S. Striker

[57] ABSTRACT

A still camera wherein the housing supports an indexible flashcube having cartridges which must be struck in order to fire the respective lamps. The housing contains a pivotable impeller which is released to the action of a torsion spring to strike against the cartridge for that lamp which faces the subject or scene when the user moves a pivotable release lever from its starting position. A resetting lever is provided to automatically return the impeller to its cocked position as soon as the impeller strikes against the adjacent cartridge. The resetting lever is then moved back to its normal position of engagement with an elastic pawl by a tensioning member which is actuated by the film transporting mechanism. The tensioning member thereby stresses the torsion spring for the impeller as well as a second spring which serves to pivot the resetting lever in a direction to return the impeller to its cocked position.

15 Claims, 2 Drawing Figures

INVENTOR
ALFRED WINKLER

CAMERA WITH IMPELLER-ACTUATED SOURCE OF ARTIFICIAL LIGHT

BACKGROUND OF THE INVENTION

The present invention relates to photographic apparatus in general, and more particularly to improvements in cameras of the type wherein a built-in or detachable source of artificial light can be actuated to illuminate a subject or scene in response to actuation of the release element, i.e., in response to opening of the shutter. Still more particularly, the invention relates to improvements in cameras of the type wherein the release element can free an impeller which is thereby permitted to move from a cocked position to an uncocked position. The source of artificial light which can be used with or in the camera of the present invention may be a flashcube or an analogous holder for lamps which can be fired by cartridges, or an electronic flash unit which can receive high-voltage pulses from a piezoelectric element or the like.

SUMMARY OF THE INVENTION

An object of the invention is to provide a camera with a simple, rugged, reliable and compact mechanism capable of furnishing the force which is necessary to produce a high-voltage pulse or to fire a lamp by way of a cartridge in response to movement of the release element of the camera from its starting position.

Another object of the invention is to provide a camera with an impeller which can be automatically cocked during normal manipulation of the camera to be ready for striking against a piezoelectric element or against a cartridge in response to renewed actuation of the camera release element.

A further object of the invention is to provide a camera with an impeller which occupies little room and wherein the mechanism for cocking the impeller upon completion of an exposure consists of a small number of simple and rugged parts.

The invention is embodied in a camera which comprises a housing or body supporting or accommodating a source of artificial light which includes an impact receiving portion (such as one or more cartridges which can be struck to thereby fire flash lamps or a piezoelectric block which can be struck to produce a high-voltage pulse which is necessary to fire an electronic flash unit), an impeller which is pivotable or reciprocable in the housing between cocked and uncocked positions and strikes against the impact receiving portion of the light source during movement toward its uncocked position, release means which is movable from and back to a starting position and is provided with a tooth or other suitable retaining means for holding the impeller in the cocked position while the release means dwells in its starting position, resetting means which preferably comprises a lever pivotable or reciprocable between first and second positions to move the impeller to its cocked position in response to movement from the second to the first position, first biasing means which reacts against the resetting means and bears against the impeller to urge the latter toward its uncocked position, second biasing means for urging the resetting means to its second position, blocking means for releasably holding the resetting means in the first position and for releasing the resetting means to the action of the second biasing means during or upon completion of movement of the impeller to its uncocked position (i.e., in response to movement of the release means from its starting position) whereby the second biasing means is free to move the resetting means to its second position and the resetting means automatically returns the impeller to its cocked position, and tensioning means which can be actuated by the film transporting mechanism to return the resetting means to its first position with attendant tensioning of the first and second biasing means. Savings in space can be achieved if the impeller and the resetting means are pivotable in the housing about a common axis.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
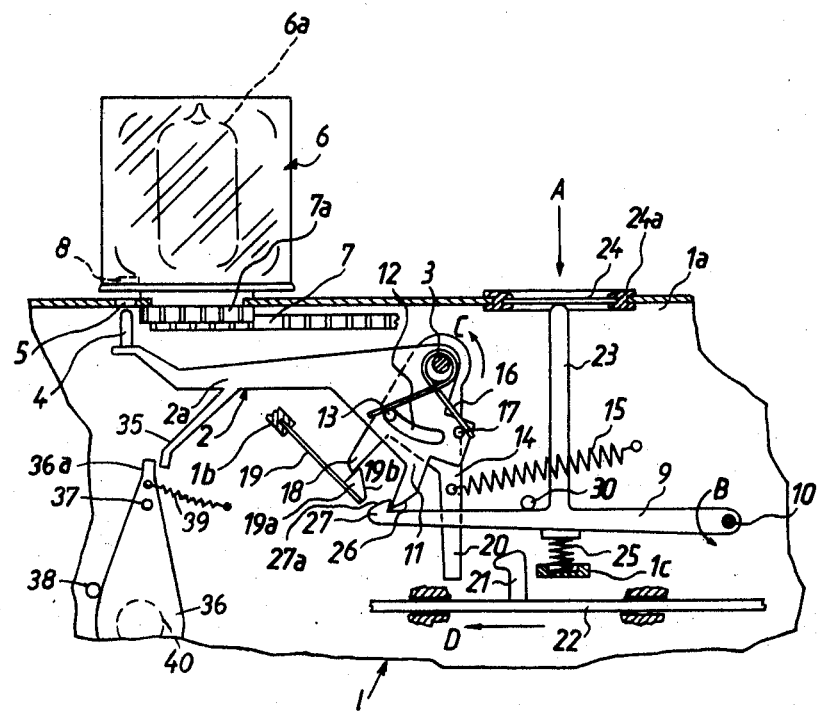
FIG. 1 is a fragmentary vertical sectional view of a still camera which embodies the invention.

FIG. 1 illustrates a portion of the housing or body 1 of a still camera which is provided with a horizontal pivot pin 3 for a two-armed impeller 2. The actuating portion or arm 2a of the impeller 2 is provided at its free end with an extension in the form of a firing pin 4 which can pass through an opening 5 in the top wall 1a of the housing 1 to strike against an impact receiving cartridge 8 in a source 6 of artificial light. The illustrated source 6 is a flashcube having four lamps 6a and four cartridges 8, one for each lamp. When the pin 4 strikes against the adjacent cartridge 8 in response to pivotal movement of the impeller 2 from the illustrated cocked position to an uncocked position, the cartridge fires the respective lamp 6a to illuminate the subject or scene simultaneously with opening of the shutter. The flashcube 6 is detachable from the housing 1 and is provided with a gear 7a meshing with a gear 7 which forms part of the film transporting mechanism and indexes the flashcube through 90° or through a whole multiple of 90° when the film is transported by the length of a frame.

Figure 2:
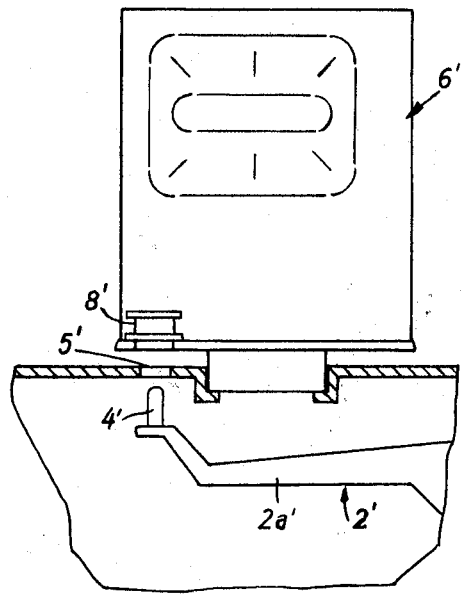
FIG. 2 is a fragmentary vertical sectional view of the camera shown in FIG. 1 but illustrating a modified source of artificial light.

The flashcube 6 of FIG. 1 can be replaced with a different source of artificial light, for example, with an electronic flash unit 6' shown in FIG. 2. The source 6' then comprises a piezoelectric block 8 which can be struck by the pin 4' or by an otherwise configurated extension of the actuating arm 2a' to produce a high-voltage pulse for the firing of the electronic flash unit in response to movement of the impeller 2' from its cocked position. FIG. 2 further shows the opening 5' in the top wall of the camera housing. It is also possible to replace the flashcube 6 of FIG. 1 with a flashcube wherein the cartridges 8 need not be directly engaged by the extension 4; such modified flashcube can comprise one or more tensioned firing mechanisms which are actuated when the extension 4 is propelled through the opening 5 to cause the respective cartridges to fire the associated lamps when the impeller is permitted to leave its cocked position.

The second arm or extension 11 of the impeller 2 shown in FIG. 1 is normally held by a retaining portion or pallet 27 which is provided on a release element 9 here shown as a substantially T-shaped lever which is pivotable on a fixed pin 10 provided therefor in the housing 1 and has an arm 23 which abuts against the underside of a deformable diaphragm 24 mounted in a frame 24a which is installed in the top wall 1a of the housing. The impeller 2 is further provided with an arcuate slot 12 whose center of curvature is located on the axis of the pivot pin 3 and which receives a pin 13 provided on a resetting lever 14. The latter is also pivotable on the pin 3 and has a tooth or arm 18 which normally engages a tooth 19a provided on a yieldable springy blocking pawl 19 which is secured to the housing 1, as at 1b. A helical return spring 15 is attached to a post in the housing 1 and to a post on the resetting lever 14 and serves to bias the latter in a counterclockwise direction, as viewed in the drawing, so that the arm 18 bears against the tooth 19a. A torsion spring 16 is convoluted around the pivot pin 3 and has a first leg which bears against a post 17 on the impeller 2 and a second leg which bears against the pin 13 of the blocking lever 14. The torsion spring 16 tends to pivot the impeller 2 in a clockwise direction, as viewed in the drawing, and to bias the resetting lever 14 in a counterclockwise direction.

An arm 20 of the resetting lever 14 extends into the path of movement of a hooked projection 21 provided on a reciprocable tensioning member 22. A relatively weak helical spring 25 reacts against a retainer 1c in the housing 1 and bears against the release element 9 to maintain the latter's arm 23 in abutment with the underside of the diaphragm 24. The reference character 26 denotes a cam face on the arm 11 of the impeller 2; this arm constitutes a disengaging device which disconnects the tooth 19a of the blocking pawl 19 from the arm 18 of the resetting lever 14 when the spring 16 is free to propel the impeller from the illustrated cocked position toward the uncocked position.

The operation:

FIG. 1 illustrates the parts of the camera in positions they assume when the camera is ready for the making of an exposure. If the user decides to exert deforming pressure on the diaphragm 24 in the direction indicated by an arrow A, the diaphragm pushes the arm 23 downwardly so that the release element 9 is pivoted in a counterclockwise direction as indicated by the arrow B, and leaves the illustrated starting position. The retaining pallet 27 of the release element 9 is disengaged from the arm 11 of the impeller 2 so that the latter is free to pivot in a clockwise direction under the action of the torsion spring 16 whereby the pin 4 passes through the opening 5 and strikes against the adjacent cartridge 8 to fire the respective lamp 6a of the flashcube 6.

During the last stage of pivotal movement of the impeller 2 from the illustrated cocked position, the arm 11 slides along the inclined cam face 19b of the tooth 19a on the blocking pawl 19 so that the tooth 19a is disengaged from the arm 18 of the resetting lever 14. The spring 15 is then free to propel the lever 14 in the direction indicated by an arrow C whereby the lever 14 turns the impeller 2 in a counterclockwise direction so that the pin 4 is retracted into the housing 1. The inclined cam face 26 of the arm 11 slides over the cam face 27a of the retaining pallet 26 so that the latter reengages the arm 11. The release element 9 pivots in the direction indicated by the arrow B while the cam face 26 slides over the cam face 27a of the pallet 27. The spring 25 is thereupon free to expand and causes the pallet 27 to engage and hold the arm 11 of the impeller 2 so that the latter is maintained in its cocked position.

The shutter is opened by the release element 9 or by the impeller 2 at the exact moment when that lamp 6a which faces the subject or scene is fired so that the film frame which is located behind the light admitting aperture of the camera receives artificial light which is furnished by the freshly fired lamp.

In the next step, the user of the camera actuates the film transporting mechanism (including the gear 7) to advance the film by the length of a frame and to simultaneously index the flashcube 6 so that a fresh lamp 6a faces the subject. The film transporting mechanism also causes the tensioning member 22 to move in the direction indicated by the arrow D whereby the projection 21 pivots the arm 20 of the resetting lever 14 in a clockwise direction so that the arm 18 slides over the cam face 19b and is thereupon engaged by the tooth 19a of the blocking pawl 19. The spring 15 stores energy during pivotal movement of the resetting lever 14 under the action of the tensioning member 22. The tensioning member 22 returns to the illustrated retracted position upon completion of film transport by the length of a frame so that all parts reassume the positions which are shown in the drawing and the camera is ready for the next exposure.

The character 30 denotes a stop pin which is engaged by the release element 9 when the latter dwells in the illustrated starting position under the action of the spring 25. It will be noted that a minimal deformation of the diaphragm 24 suffices to disconnect the retaining pallet 27 of the release element 9 from the disengaging arm or extension 11 of the impeller 2; this is desirable because the user is less likely to shake the camera if a minimal deformation of the diaphragm 24 suffices to initiate the making of an exposure.

The resetting lever 14 performs the important function of automatically returning the impeller 2 to the illustrated cocked position after the pin 4 strikes against the adjacent cartridge 8, provided that the release element 9 dwells in its starting position. The illustrated position of the resetting lever 14 is its first position; the lever 14 leaves such first position and pivots toward a second position (counter to the direction indicated by the arrow C) when the spring 15 is free to contract.

The improved camera is susceptible of many additional modifications. For example, the resetting lever 14 and the impeller 2 need not be pivotable about a common axis. Also, the impeller 2 and/or the resetting lever 14 can be mounted in the housing 1 for reciprocatory rather than pivotal movement. Furthermore, the impeller can serve to open a simple or a complicated shutter in response to movement toward its uncocked position under the action of the torsion spring 16. The manner in which the impeller 2 actuates the shutter is similar to that disclosed in my copending application Ser. No. 146,290, filed May 24, 1971 and entitled "Photographic Apparatus with Impeller-Operated Source of Artificial Light". The arm 35 of the impeller propels a shutter blade 36 to open positions simultaneously with the generation of artificial light by the source 6 or by an equivalent source. Alternatively the impeller merely permits the movement of one or more shutter blades to their open positions in order to insure that the shutter is open at the exact moment when the source 6 or another source furnishes artificial light for illumination of the subject or scene. The shutter blade 36 of FIG. 1 is pivotable on a pin 37 and has an extension 36a which is located in the path of movement of the arm 35 when the impeller 2 moves from its cocked position. As shown in FIG. 1, the shutter blade 36 is biased against a stop 38 by a spring 39 so that it normally overlies a light-admitting opening 40.

It is equally within the purview of the invention to use the tensioning member 22 as a means for actuating the shutter, for example, to cock the shutter in response to movement of the member 22 in the direction indicated by the arrow D so that the shutter is closed and cocked when the transport of the film by the length of a frame is completed. Alternatively, the member 22 can be replaced by a shutter actuating member which tensions the springs 15 and 16 by moving the resetting lever 14 back to the (first) position of engagement with the blocking pawl 19 upon completed actuation of the shutter.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:

1. In a camera, the combination of a housing; a source of artificial light supported by said housing and having an impact receiving portion; an impeller mounted in said housing for movement between cocked and uncocked positions and arranged to strike against said impact receiving portion in response to movement from said cocked position; release means movable from and back to a starting position and having retaining means for holding said impeller in said cocked position in the starting position thereof; resetting means movable between first and second positions to thereby move said impeller from said uncocked to said cocked position; first biasing means reacting against said resetting means and arranged to bias said impeller to said uncocked position; second biasing means for urging said resetting means to said second position; blocking means for yieldably holding said resetting means in said first position and for releasing said resetting means on movement of said impeller to said uncocked position in response to movement of said release means from said starting position whereby said second biasing means is free to move said resetting means to said second position with attendant movement of said impeller back to said cocked position; and tensioning means actuatable to move said resetting means to said first position with attendant tensioning of said first and second biasing means.

2. The combination as defined in claim 1, wherein said source further comprises a lamp and said impact receiving portion comprises a cartridge arranged to fire said lamp when struck by said impeller on movement of the impeller to said uncocked position.

3. The combination as defined in claim 1, wherein said source further comprises an electronic flash unit and said impact receiving portion comprises a piezo-electric element arranged to produce a high-voltage pulse which fires said flash unit when struck by said impeller on movement of the latter to said uncocked position.

4. The combination as defined in claim 1, wherein said impeller comprises a disengaging portion arranged to disconnect said blocking means from said resetting means after the impeller completes a predetermined portion of its movement from said cocked to said uncocked position thereof.

5. The combination as defined in claim 4, wherein said impeller and said resetting means are pivotable about a common axis, said first biasing means being arranged to turn said impeller in a first direction during movement of the impeller from said cocked position and said second biasing means being arranged to turn said resetting means and said impeller in a second direction in response to disengagement of said blocking means from said resetting means.

6. The combination as defined in claim 4, wherein said disengaging portion is held by said retaining means in the cocked position of said impeller and in the starting position of said release means.

7. The combination as defined in claim 4, wherein said blocking means comprises a springy element which is deformable by said disengaging portion.

8. The combination as defined in claim 1, wherein said impeller and said resetting means are pivotable about a common axis.

9. The combination as defined in claim 1, wherein said impeller is reciprocable between said cocked and uncocked positions thereof.

10. The combination as defined in claim 1, wherein said resetting means is reciprocable between said first and second positions thereof.

11. The combination as defined in claim 1, wherein said impeller comprises an extension which reengages said retaining means in automatic response to movement of said resetting means to said second position in the starting position of said release means.

12. The combination as defined in claim 1, further comprising film transporting means actuatable to advance the film and to thereby actuate said tensioning means.

13. The combination as defined in claim 12, wherein said tensioning means is reciprocable with reference to said housing and said resetting means comprises an arm which is engaged by said blocking means in the first position of said resetting means.

14. The combination as defined in claim 1, further comprising a flexible diaphragm mounted on said housing and deformable to thereby move said release means from said starting position.

15. The combination as defined in claim 1, further comprising shutter means movable between open and closed positions, said impeller having means for moving said shutter means to open position in response to movement of said impeller to said uncocked position so that the shutter means is open when said source furnishes artificial light in response to propulsion of said impeller against said impact receiving portion under the action of said first biasing means.

* * * * *